Patented Jan. 1, 1935

1,986,111

UNITED STATES PATENT OFFICE 1,986,111

PRODUCTION OF ACRIDINE COMPOUNDS

Frederick H. Kranz, Buffalo, N. Y., assignor to National Aniline & Chemical Company, Inc., New York, N. Y., a corporation of New York No Drawing. Application September 12, 1929, Serial No. 392,255

20 Claims. (Cl. 260—36)

This invention relates to an improved process for the production of acridine compounds from diortho-diamino-diarylmethane compounds and their derivatives.

This application is in part a continuation of my copending application, Serial No. 11,366, filed February 24, 1925.

It is well known that diortho-diamino-diarylmethane compounds of the general formula

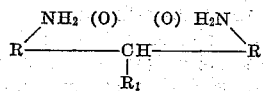

where R represents an aryl nucleus in which an amino group occupies an ortho position relative to the methane carbon atom and which nucleus may contain substituents in other positions, and $R_1$ represents a hydrogen atom or an alkyl or aryl group, upon being heated with acids in an autoclave at elevated temperatures (130°–150° C.), eliminate ammonia and yield acridine compounds or their corresponding dihydro derivatives.

It is also known that tetramino-diphenylmethane compounds substituted in the amino groups by alkyl, yield acridine compounds when heated with acid under a reflux condenser.

I have now found that polyamino-diarylmethane compounds which are free from amino groups which contain substituents yield acridine compounds when heated at atmospheric pressure under reflux conditions.

I have also found it desirable in the condensation of the N-unsubstituted poly-amino diarylmethane compounds to acridines, to exclude air in order to obviate the obtainment of poor products and poor yields. This may be attained by carrying out the process at boiling temperature under a reflux condenser. Under these conditions condensation takes place in a non-oxidizing atmosphere, or nearly so, since steam or water-vapor practically replaces the air originally present in the reaction vessel.

An object of the invention is to provide a process for the manufacture of acridine compounds from N-non-substituted polyamino-diphenylmethane bodies commercially and economically without the use of an autoclave.

Another object of the invention is to provide a process for the manufacture of acridine compounds from polyamino-diphenylmethane bodies with exclusion of air under refluxing conditions.

Other objects of the invention will in part be obvious and will in part appear hereinafter.

According to the present invention, the elimination of ammonia and the production of acridine compounds, for their dihydro derivities from N-non-substituted polyamino-diphenylmethane compounds, for example tetramino-diphenylmethane compounds of the following probable formula:

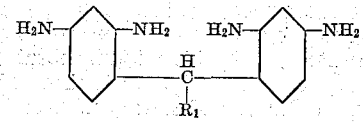

where the benzene nuclei may or may not contain substituents, such as $CH_3$, etc., and $R_1$ represents a hydrogen atom, an alkyl, or an aryl group, can be effected under reflux with practical exclusion of air at ordinary atmospheric pressure without the use of an autoclave and at temperatures below those ordinarily employed. The aforesaid tetramino-diphenylmethane compounds may be converted into their corresponding acridine or dihydro-acridine compounds by heating them to boiling under a reflux condenser at ordinary atmospheric pressure with an aqueous solution of sulfuric acid in the presence or absence of soluble, inert salts, the amount of sulfuric acid employed being about 3 to 4.5, preferably about 3.5 to 4, mols or molecular proportions to each mol or molecular proportion of the diarylmethane compound, and the amount of water approximately 2.5 to 6 or more times, preferably 3.5 to 5.5, times the weight of the sulfuric acid. In the absence of soluble salts, the reaction mixture should boil preferably at about 102° to 105° C., in their presence at about 102° to 108° C., depending on the amount of such salts present. Such non-oxidizing salts as sodium sulfate, sodium chloride, etc., may be employed. Equivalent quantities of other inorganic acids, such as hydrochloric acid, and other strong non-oxidizing inorganic acids may be used in place of sulfuric acid.

The following specific example will further illustrate the invention, but it is to be understood that the invention is not limited thereto. The parts are by weight.

Example: To 50 parts (1 mol) of 5,5'-dimethyl-2,2',4,4'-tetraminodiphenylmethane, are added about 335 parts water and about 80 parts (about 3.5 to 4 mols) of 66° Bé. sulfuric acid and the mixture is boiled with vigorous agitation under a reflux condenser at atmospheric pressure for about 72 hours, or until the reaction is completed.

Upon heating the mixture to its boiling point (about 102°–104° C.), the tetraminoditolylmethane goes into solution, the solution soon assuming a yellowish red color and 2,7-dimethyl-3,6-diaminoacridine sulfate (acridine yellow) gradually separates out. When the reaction is complete, the dyestuff is separated, washed, and dried in any suitable manner. In the form of the free base, it has the following probable formula:

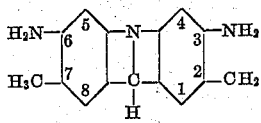

If, in this example, a lesser amount of water is used, the time required to complete the reaction is prolonged. For example, if 180 parts of water instead of 335 parts are used, then about 96 hours is required to complete the reaction. The amount of acid may be varied somewhat without effecting the yields to any great extent. But, as the amount of acid is decreased below about 65 parts (about 3 mols), by-products are formed in greater amounts; and if it is increased above about 95 parts (about 4.5 mols), the yield of acridine yellow decreases. Thus, not only the amount of acid used, but also its strength (which is determined by the amount of water present) is important if good yields are to be obtained. For best results, the amount of acid should be about 3.5 to 4 mols per mol of tetraminoditolylmethane and the strength of the acid should be such that the mixture, in the absence of soluble inorganic salts, boils at about 102° to 104° C. By carrying out the process at boiling temperature and under a reflux condenser, the condensation is performed in a nearly non-oxidizing atmosphere, since water-vapor will have replaced the air above the reaction mixture. Various amounts of sodium sulfate, or other soluble inert salts, may be present or added to the mixture, in which case the boiling point will be higher than when such salts are absent.

The process can be also carried out under atmospheric pressure without using a reflux condenser by conducting it in an inert atmosphere (i. e., non-oxidizing atmosphere, e. g., steam, carbon dioxide, nitrogen, etc.) and keeping the volume of the reaction-mixture practically constant by the addition of water during the operation to replace that which is removed or lost by evaporation.

In a similar manner, other N-non-substituted tetraminoarylmethane compounds may be converted into their corresponding acridine compounds or leuco compounds, for example, 5,5'-dimethyl - 2, 2',4,4' - tetraminotriphenylmethane, etc.

In the claims, it will be understood that the term "acridine compounds" includes the acridine and dihydroacridine compounds.

Since certain changes in carrying out the above process may be made without departing from its scope, it is intended that all matter contained in the above description shall be interpreted as illustrative and not in a limiting sense.

I claim:

1. In the process of making acridine compounds from polyamino-diphenylmethane compounds which are free from amino groups that contain substituents, the improvement which comprises heating one molecular proportion of a said diphenylmethane compound to boiling under atmospheric pressure with about 3.5 to 4 molecular proportions of a strong, non-oxidizing inorganic acid in the presence of water, the amount of water being such that the mixture boils at about 102–104° C.

2. In the process of making acridine compounds from polyamino-diphenylmethane compounds which are free from amino groups that contain substituents, the improvement which comprises heating one molecular proportion of a said diphenylmethane compound under refluxing conditions at atmospheric pressure with about 3.5 to 4 molecular proportions of a strong, non-oxidizing inorganic acid while maintaining a non-oxidizing atmosphere, and maintaining such an amount of water in the reaction mixture that the mixture boils at about 102° to 104° C.

3. In the process of making acridine compounds from polyamino-diphenylmethane compounds which are free from amino groups that contain substituents, the improvement which comprises heating one molecular proportion of a said diphenylmethane compound under refluxing conditions at atmospheric pressure with about 3.5 to 4 molecular proportions of sulfuric acid in the presence of water, the amount of water being such that the mixture boils at about 102–104° C.

4. In the process of making acridine compounds from polyamino-diphenylmethane compounds which are free from amino groups that contain substituents, the improvement which comprises heating one molecular proportion of a said diphenylmethane compound to boiling under refluxing conditions at atmospheric pressure with about 3 to 4.5 molecular proportions of sulfuric acid in the presence of an amount of water and of a soluble, non-oxidizing inorganic salt such that the mixture boils at 102–108° C.

5. In the process of making acridine compounds, the improvement which comprises heating one molecular proportion of 5,5'-dimethyl-2,2',4,4'-tetraminodiphenylmethane to boiling under reflux conditions at atmospheric pressure with about 3 to 4.5 molecular proportions of sulfuric acid in the presence of water, the amount of water being such that the mixture boils at about 102–105° C.

6. In the process of making acridine compounds, the improvement which comprises heating one molecular proportion of 5,5'-dimethyl-2,2',4,4'-tetraminodiphenylmethane to boiling under reflux conditions at atmospheric pressure with about 3 to 4.5 molecular proportions of sulfuric acid in the presence of water, the amount of water being about 3.5 to 5.5 times the weight of acid employed.

7. In the process of making acridine compounds, the improvement which comprises heating one molecular proportion of 5,5'-dimethyl-2,2',4,4'-tetraminodiphenylmethane to boiling under reflux conditions at atmospheric pressure with about 3 to 4.5 molecular proportions of sulfuric acid in the presence of an amount of water and of a soluble, non-oxidizing inorganic salt such that the mixture boils at 102–108° C.

8. In the process of making acridine compounds from polyamino-diphenylmethane compounds which are free from amino groups that contain substituents, the improvement which comprises heating a said diphenylmethane compound with a strong non-oxidizing inorganic acid, in the presence of water to boiling under atmospheric pressure in a non-oxidizing atmosphere.

9. In the process of making acridine compounds from polyamino-diphenylmethane compounds which are free from amino groups that contain substituents, the improvement which comprises heating a said diphenylmethane compound with sulfuric acid in the presence of water to boiling under atmospheric pressure in a non-oxidizing atmosphere.

10. In the process of making acridine compounds, the improvement which comprises heating 5,5'-dimethyl-2,2',4,4'-tertaminodiphenylmethane with sulfuric acid in the presence of water to boiling under reflux conditions at atmospheric pressure in a non-oxidizing atmosphere.

11. In the process of making acridine yellow, the improvement which comprises heating one molecular proportion of 5,5'-dimethyl-2,2',4,4'-tetraminodiphenylmethane to boiling at ordinary atmospheric pressure with about 3.5 to 4 molecular proportions of sulfuric acid while maintaining a non-oxidizing atmosphere, and maintaining such an amount of water in the reaction mixture that the mixture boils at about 102° to 104° C.

12. The process according to claim 11 in which the mixture is boiled under refluxing conditions for a period of about 72 hours.

13. In the process of making acridine yellow, the improvement which comprises heating one molecular proportion of 5,5'-dimethyl-2,2',4,4'-tetraminodiphenylmethane to boiling under a reflux condenser under ordinary atmospheric pressure with about 3.5 to 4 molecular proportions of a strong non-oxidizing inorganic acid in the presence of water, the amount of water being such that the mixture boils at about 102° to 104° C.

14. The process according to claim 13 in which the mixture is boiled under a reflux condenser for a period of about 72 hours.

15. In the production of acridine yellow, a process which comprises heating one molecular proportion of 5,5'-dimethyl-2,2',4,4'-tetraminodiphenylmethane to boiling under atmospheric pressure with about 3 to 4.5 molecular proportions of sulfuric acid in the presence of an amount of water and of sodium sulfate such that the mixture boils at about 102°–108° C.

16. In the process of making acridine yellow, the improvement which comprises heating one molecular proportion of 5,5'-dimethyl-2,2',4,4'-tetraminodiphenylmethane to boiling under ordinary atmospheric pressure with about 3.5 to 4 molecular proportions of sulfuric acid in the presence of water, the amount of water being such that the mixture boils at about 102° to 104° C.

17. The process according to claim 16 in which the mixture is boiled for a period of about 72 hours.

18. In the process of making acridine compounds from polyamino-diarylmethane compounds of the benzene series which are free from amino groups that contain substituents, the improvement which comprises heating one molecular proportion of a said amino-diarylmethane compound to boiling under atmospheric pressure with about 3 to 4.5 molecular proportions of a strong non-oxidizing inorganic acid in the presence of water, the amount of water being such that the mixture boils at about 102° to 105° C.

19. In the process of making acridine compounds from tetraminodiphenylmethane compounds which are free from amino groups which contain substituents, and which contain in each benzene nucleus an amino group in ortho position to the position linked to the methane carbon atom, the improvement which comprises heating one molecular proportion of said tetraminodiphenylmethane compound with 3 to 4.5 molecular proportions of sulfuric acid to boiling under atmospheric pressure in the presence of an amount of water such that the mixture is maintained at a boiling temperature of about 102° to 105° C. until the reaction is completed.

20. In the process of making acridine compounds from diortho-diaminodiphenylmethane compounds which are free from amino groups which contain substituents, the improvement which comprises heating one molecular proportion of a said diortho-diaminodiphenylmethane compound to boiling under atmospheric pressure with about 3.5 to 4 molecular proportions of a strong non-oxidizing inorganic acid in the presence of water, the amount of water being such that the mixture boils at about 102° to 104° C.

FREDERICK H. KRANZ.

Certificate of Correction

Patent No. 1,986,111.  January 1, 1935.

FREDERICK H. KRANZ

It is hereby certified that errors appear in the printed specification of the above numbered patent requiring correction as follows: Page 1, second column, line 1, for the words "for their dihydro derivities" read *or their dihydro derivatives*; and page 2, first column, line 11, at the extreme lower right portion of the formula, for "$CH_2$" read $CH_3$; and that the said Letters Patent should be read with these corrections therein that the same may conform to the record of the case in the Patent Office.

Signed and sealed this 5th day of February, A. D. 1935.

[SEAL]  LESLIE FRAZER,
*Acting Commissioner of Patents.*